(12) United States Patent
Thueringer et al.

(10) Patent No.: US 6,655,599 B2
(45) Date of Patent: Dec. 2, 2003

(54) DATA CARRIER HAVING RESET MEANS FOR INTERRUPTING THE PROCESSING

(75) Inventors: Peter Thueringer, Graz (AT); Klaus Ully, Graz (AT); Peter Kompan, Graz (AT); Markus Feuser, Hamburg (DE); Torsten Kramer, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 364 days.

(21) Appl. No.: 09/847,220

(22) Filed: May 2, 2001

(65) Prior Publication Data

US 2001/0052548 A1 Dec. 20, 2001

(30) Foreign Application Priority Data

May 3, 2000 (EP) .............................................. 00890141

(51) Int. Cl.[7] .............................. G06K 19/06; G06K 7/08
(52) U.S. Cl. ........................................ 235/492; 235/451
(58) Field of Search ................................. 235/451, 492

(56) References Cited

U.S. PATENT DOCUMENTS

| | | | | |
|---|---|---|---|---|
| 5,068,521 A | * | 11/1991 | Yamaguchi | ................. 235/492 |
| 5,326,965 A | * | 7/1994 | Inoue | ......................... 235/492 |
| 5,736,728 A | | 4/1998 | Matsubara | ................... 235/492 |
| 6,070,804 A | * | 6/2000 | Miyamoto | .................. 235/494 |
| 6,474,558 B1 | * | 11/2002 | Reiner | ........................ 235/492 |

FOREIGN PATENT DOCUMENTS

WO          9950738 A      10/1999

* cited by examiner

Primary Examiner—Thien M. Le
Assistant Examiner—April Nowlin
(74) Attorney, Agent, or Firm—Steven R. Biren

(57) ABSTRACT

A data carrier (4) for the contactless communication of communication information (KD) with a transmitting/receiving station (1) includes receiving circuit (7) for receiving an HF signal (HF) containing the communication information (KD) from the transmitting/receiving station (1), and processing circuit (10) for processing the received communication information (KD), and supply voltage generating circuit (13) for rectifying the received HF signal (HF) and for energizing the processing circuit (10) with a supply voltage (UV), and reset circuit (14) for resetting, when the supply voltage (UV) decreases below a reset voltage value (UR), the processing performed by the processing circuit (10), the reset circuit (14) now being adapted to interrupt the processing of the communication information (KD) by the processing circuit (10) at least partially when the supply voltage (UV) decreases below an interruption voltage value (UU), the interruption voltage value (UU) being greater than the reset voltage value (UR).

4 Claims, 1 Drawing Sheet

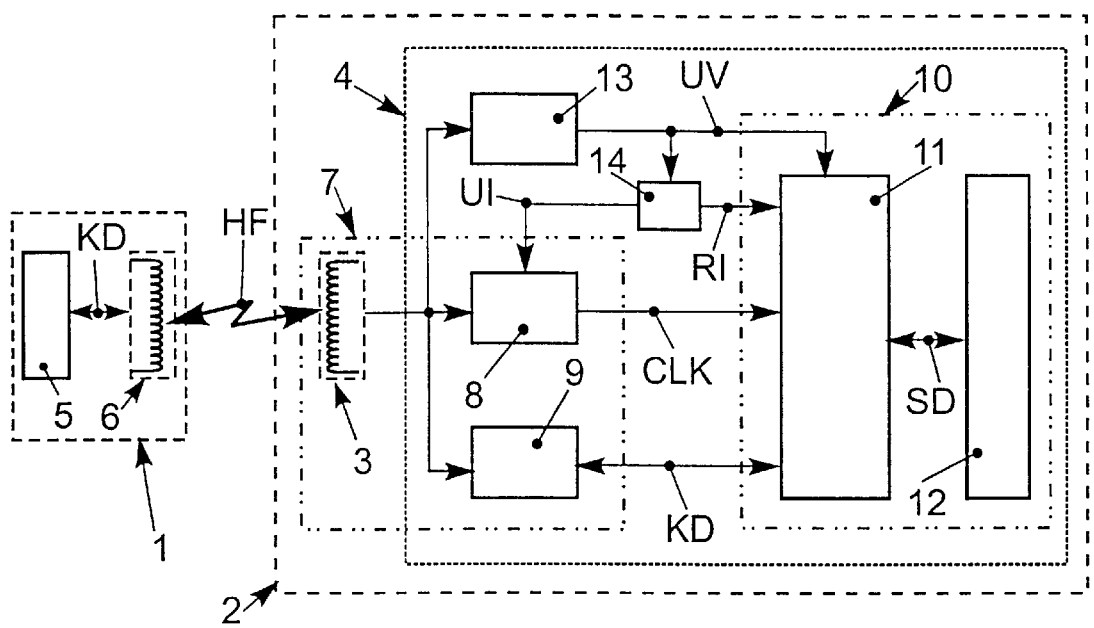
FIG. 1
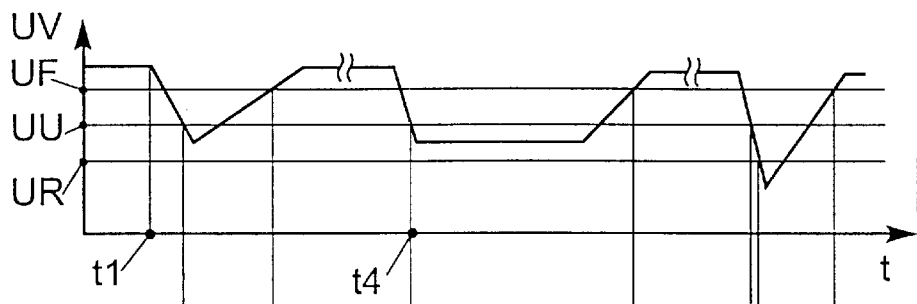
FIG. 2A
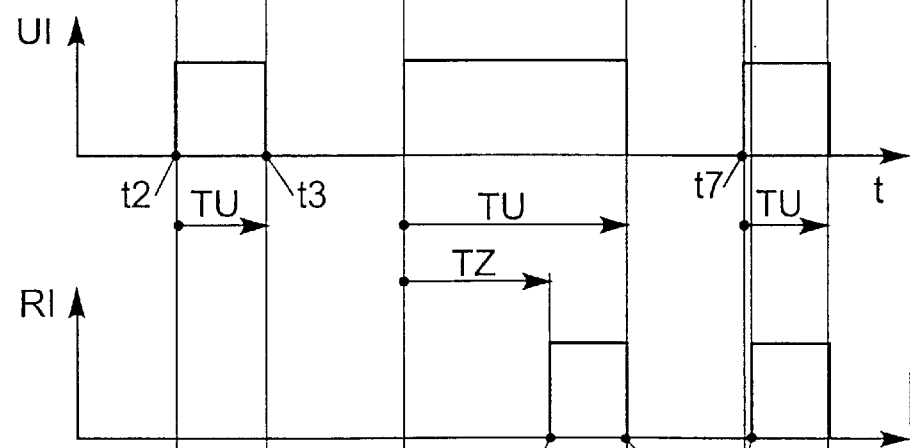
FIG. 2B
FIG. 2C
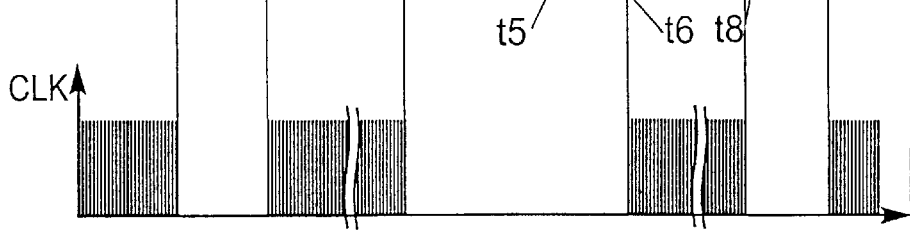
FIG. 2D

DATA CARRIER HAVING RESET MEANS FOR INTERRUPTING THE PROCESSING

BACKGROUND OF THE INVENTION

The invention relates to a data carrier for the contactless communication of communication information with a transmitting/receiving station, having receiving means for receiving an HF signal containing the communication information from the transmitting/receiving station, and having processing means for processing the received communication information, and having supply voltage generating means for rectifying the received HF signal and for energizing the processing means with a supply voltage, and having reset means for resetting, when the supply voltage decreases below a reset voltage value, the processing performed by the processing means.

Such a data carrier of the type defined in the opening paragraph is known from U.S. Pat. No. 5,736,728 and is formed by a transponder of a smart card. The known data carrier is adapted to provide contactless communication of communication information with a transmitting/receiving station. For this purpose, the data carrier has receiving means which include an antenna stage, a clock generation stage and a demodulation stage. By means of the antenna stage it is possible to receive an HF signal from the transmitting/receiving station, which signal may contain communication information in the form of modulated communication data. The clock generation stage is adapted to derive a clock signal from the HF signal and the demodulation stage is adapted to demodulate the modulated communication data received. The demodulated communication data are processed by processing means and, if necessary, stored in the data carrier.

The known data carrier further has supply voltage generating means adapted to rectify the received HF signal and to supply a supply voltage to the processing means. Since the known data carrier does not have a battery or other power source the processing means can process the received communication data only when the supply voltage has a sufficiently high voltage value.

The data carrier has reset means in order to guarantee a reliable processing of the communication data by the processing means. The reset means are adapted to reset the processing means and re-start the processing of the communication data by the processing means when the supply voltage decreases below a reset voltage value. Thus, it is precluded that the processing means carry out certain processing operations (for example, a storage operation) for whose reliable completion the supply voltage having the reset voltage value would be inadequate.

It has been found that the known data carrier has the disadvantage that the processing of the communication data by the processing means is interrupted comparatively often by a reset from the reset means and should be started virtually anew, although in certain cases this would not be necessary while the reliability with which the communication data are processed remains the same.

SUMMARY OF THE INVENTION

It is an object of the invention to provide a data carrier in which the processing by the processing means is reset only when this is absolutely necessary in order to maintain the reliability of the processed communication data. According to the invention, in order to achieve this object with a data carrier of the type defined in the opening paragraph, the reset means are adapted to interrupt the processing of the communication information by the processing means at least partially when the supply voltage decreases below an interruption voltage value, the interruption voltage value being greater than the reset voltage value.

Thus, it is achieved that the processing of the communication data by the processing means is merely interrupted for the time being and is resumed at the same stage of processing, for example after expiry of a given time interval. During the break in the processing the processing means consume hardly any power, for which reason the supply voltage generating means can generate the supply voltage with a voltage value which is adequate to maintain the processing status of the processing means even in the case of an HF signal having only a small amplitude.

This has the advantage that in certain cases, in which the data carrier is already comparatively far from the transmitting/receiving station and the amplitude of the HF signal is comparatively low, processing of the communication information with interruptions is possible altogether and can also be effected without unnecessary delays by a reset of the processing means.

It is to be noted that from the document WO99/50738 a data carrier is known which has pause detection means for the detection pause intervals in which the amplitude-modulated HF signal has a lower amplitude. The pause detection means are adapted to interrupt the processing of the processing means in pause intervals. However, the aforementioned object cannot be achieved with these pause detection means because the supply voltage depends not only on the amplitude of the HF signal but also very strongly on the instantaneous power consumption of the processing means and on further factors of influence that cannot be determined with the aid of the known pause detection means. Such influence factors are the temperature dependence and the load dependence of the supply voltage generated by the supply voltage generating means, which also depends on tolerances of the components of the supply voltage generating means.

The measures defined in claim 2 have the advantage that the processing of the communication information by the processing means is resumed only when the supply voltage generating means supply an adequate supply voltage which is unlikely to be followed directly by another interruption.

The measures defined in claim 3 have the advantage that, when the break in the processing of the communication information by the processing means has become too long and the data stored temporarily in the processing means are no longer reliable, processing is not resumed but is restarted by a reset.

BRIEF DESCRIPTION OF THE DRAWINGS

The invention will now be described in more detail with reference to an embodiment given by way of example but to which the invention is not limited.

FIG. 1 shows a smart card for the contactless communication of communication data, which smart card has reset means for the interruption of the processing of communicated communication data.

FIGS. 2A to 2D show signal waveforms of the supply voltage and further signals that can appear in the data carrier shown in FIG. 1.

DESCRIPTION OF THE PREFERRED EMBODIMENTS

FIG. 1 shows a transmitting/receiving station 1 and a smart card 2. The smart card 2 includes an antenna stage 3 and a data carrier 4 in the form of an integrated circuit. The data carrier 4 is adapted to provide contactless communication of communication information with the transmitting/receiving station 1.

The transmitting/receiving station 1 has processing means 5 and an antenna stage 6. The processing means 5 are adapted to execute a communication protocol and to process communication data KD to be transmitted to the smart card 2 and received by the smart card 2. The communication protocol executed by the processing means 5 complies with the standard ISO14443. The processing means 5 can supply modulated communication data KD as a high-frequency signal HF having a frequency of 13.56 MHz and can receive such data from the antenna stage 3 of the smart card 2.

The data carrier 4 has receiving means 7 for receiving the HF signal HF containing the modulated communication data KD from the transmitting/receiving station 1. In this case the receiving means 7 are formed by clock generation means 8, modulator/demodulator means 9 and the antenna stage 3.

The HF signal HF received by the antenna stage 3 can be applied to the clock generation means 8 and the clock generation means 8 are adapted to derive a clock signal CLK from the HF signal HF. Moreover, the HF signal HF received from the antenna stage 3 can be applied to modulator/demodulator means 9 and the modulated communication data KD contained in the HF signal HF can be demodulated by the modulator/demodulator means 9. Such receiving means 7 of such a data carrier 4 are known from, for example, the document WO 99/50738, the disclosure in said document being incorporated in the present document by reference.

The data carrier 4 further has processing means 10 adapted to process communication data KD received by the receiving means. For this purpose, the processing means 10 include a calculating stage 11 and a memory stage 12. The calculating stage 11 is formed by a microprocessor of the type 80C51 and the memory stage is formed by a RAM (Random Access Memory), a ROM (Read Only Memory) and an EEPROM (Electrically Erasable Programmable Read Only Memory). The calculating stage 11 can receive the clock signal CLK generated by the clock generation means 8 and the communication data KD determined by the modulator/demodulator means 9.

The calculating stage 11 executes a processing program during whose execution the communication KD received or to be supplied are processed and any processed communication data KD are stored in the memory stage 12 as memory data SD. The speed at which the processing program is executed by the calculating stage 11 is dictated by the clock signal CLK.

The data carrier 4 further includes supply voltage generating means 13 to which the HF signal HF received from the antenna stage 3 can be applied and which are adapted to rectify the received HF signal HF and to energize the processing means 10 with a supply voltage UV. In this case, the supply voltage generating means 13 are formed by a diode and a capacitor.

It is to be noted that the supply voltage UV generated by the supply voltage generating means 13 is dependent on the amplitude of the HF signal HF, on the instantaneous power consumption of the processing means 10 and an further influence factors. Such influence factors are the temperature dependence and the load dependence of the supply voltage UV generated by the supply voltage generating means 13, which also depends on tolerances of the components of the supply voltage generating means 13. The amplitude of the HF signal HF, in its turn, depends on the modulation depth, the transmitted communication data KD and the distance from the transmitting/receiving station 1. The supply voltage generating means 13 include a supply voltage limiting stage for limiting the supply voltage UV supplied by the supply voltage generating means 13 to a maximum voltage value.

The data carrier 4 further includes reset means 14 for resetting the processing performed by the calculating stage 11 when the supply voltage UV decreases below a reset voltage value UR. For this purpose, the reset means 14 supply reset information RI to the calculating stage 11, upon which the execution of the processing program is re-started with a boot routine. When the processing by the calculating stage 11 is reset all the communication data KD just processed by the calculating stage 11 are discarded and during a renewed communication they must be received and processed again. As a result of this, each reset of the calculating stage 11 leads to a prolongation of the processing time required for the communication and processing of the communication data KD. Therefore, the reset stage 14 only supplies reset information RI to the calculating stage 11 when this is absolutely necessary in order to maintain the reliability of the processed communication data KD.

In order to guarantee this, the reset means 14 are adapted to, at least partially, interrupt the processing of the communication data KD by the processing means 10 when the supply voltage UV decreases below an interruption voltage value UU, the interruption voltage value UU being greater than the reset voltage value UR. When the supply voltage UV becomes smaller than the interruption voltage value UU the reset means 14 supply interruption information UI to the clock generation means 8. The clock generation means 8 are adapted to supply the clock signal CLK to the calculating stage 11 upon reception of the interruption information UI.

Thus, it is achieved that the processing of the communication data KD by the processing means 10 is merely interrupted for the time being and can be resumed with the same processing status, for example after expiry of a given time interval. During the break in the processing the processing means 10 consume hardly any power, for which reason the supply voltage generating means 13 can generate the supply voltage UV with a voltage value which is adequate to maintain the processing status of the processing means 10 even in the case of an HF signal HF having only a small amplitude.

This has the advantage that in certain cases, in which the data carrier 4 is already comparatively far from the transmitting/receiving station 1 and the amplitude of the HF signal HF is comparatively low, processing of the communication data KD with interruptions is possible altogether and can also be effected without an unnecessary prolongation of the processing time by a reset of the processing means 10. This will be described in more detail hereinafter with the aid of an example of use.

In the example of use it is assumed that a user of the smart card 2 holds the smart card 2 in the proximity of the transmitting/receiving station 1 and a transfer of communication data KD between the transmitting/receiving station 1 and the smart card 2 begins. It is further assumed that at an instant t1, while the processing means 10 perform a loading operation in which the memory data SD from the calculating stage 11 are loaded into the memory stage 12, the user holds the smart card 2 at a greater distance from the transmitting/receiving station 1. Since the power consumption of the processing means 10 during the loading operation is comparatively high and at the same time the amplitude of HF signal HF applied to the supply voltage generating means 13 decreases, the voltage value of the supply voltage UV supplied by the supply voltage generating means 13 decreases rapidly, as is shown in FIG. 2A.

At an instant t2 the voltage value of the supply voltage UV becomes smaller than the interruption voltage value UU, upon which the reset means 14 supply the interruption information UI to the clock generation means 8, as is shown in FIG. 2B. As is shown in FIG. 2D, the clock generation means 8 then interrupt the supply of the clock signal CLK to the calculating stage 11, upon which the loading operation of the processing means 10 is interrupted. As a result of the interruption of the loading operation the processing means 10 consume hardly any more power, as a result of which the supply voltage generating means 13, even with the comparatively small amplitude of the HF signal HF, are adapted to stop the rapid decrease of the voltage value of the supply voltage UV and eventually even to increase the voltage value of the supply voltage UV.

This interruption of the processing by the processing means 10 duly before the reset voltage value UR of the supply voltage UV is reached has the advantage that in this case there is no decrease below the reset voltage value UR and a reset of the processing performed by the calculating stage 11 can be precluded. This precludes a possible storage of incorrect memory data SD caused by a reset during the loading operation and, in any case, an unnecessary prolongation of the processing time.

At an instant t3 the voltage value of the supply voltage UV decreases below a continuation voltage value UF greater than the interruption voltage value UU. Subsequently, the reset means 14 terminate the supply of interruption information UI to the clock generation means 8, upon which the clock generation means 8 proceed with the supply of the clock signal CLK to the calculating stage 11. Subsequently, the calculating stage 11 resumes processing of the communication data KD with the processing status prevailing at the instant t2 of the interruption.

The provision of the continuation voltage value UF, whose voltage value is higher than the interruption voltage value U, has the advantage that at the instant t3 the power stored in the capacitor of the supply voltage generating means 13 is adequate to energize the processing means 10 with power, i.e. with an adequate supply voltage UV, for at least a given processing time even if the amplitude of the HF signal HF remains invariably low.

Therefore, in the case of a comparatively large distance between the smart card 2 and the transmitting/receiving station 1, it is the provision of the reset means 14 in accordance with the invention which enables a communication and a processing of communicated communication data KD in which the communication data KD are processed with interruptions. In other, less critical cases an unnecessary prolongation of the processing time is prevented by a reset produced by a decrease of the supply voltage UV below the reset voltage value UR.

In the example of use the voltage value of the supply voltage UV again decreases below the interval UU at an instant t4, upon which the reset means 14 supply the interruption information UI to the clock generation means 8. Subsequently, the clock generation means 8 discontinue the supply of the clock signal CLK and the calculating stage 11 interrupts the processing of the communication data KD.

The reset means 14 are now adapted to determine an interruption time interval TU during which the processing of the communication data KD was at least interrupted. Moreover, the reset means 14 are adapted to reset the processing means 10 when the interruption time interval TU thus determined exceeds a reliability time interval TZ. At an instant t5 the reset means 14 detect that the reliability time interval TZ is exceeded, upon which the reset means 14 supply the reset information RI to the calculating stage 11, as is illustrated in FIG. 2C. Subsequently, the processing of the communication data KD by the calculating stage 11 is reset.

This has the advantage that the processing is started anew when the processing of the communication data has been interrupted for a comparatively long time. In this way it is avoided that the processing is continued with a memory value of a memory location of the RAM or the 80C51 that has been changed as a result of component tolerances or potential variations during a long interruption time interval TU, which could lead to erroneous memory data SD.

It is to be noted that a hacker could attempt to detect any secret memory data SD stored in the memory stage 12 by means of a so-called voltage contrast analysis method. In the voltage contrast analysis method it is attempted to achieve that the processing means execute the processing program very slowly so as to enable the changes of the electric potential at particular positions of the hardware of the data carrier 4 to be determined by means of an electron microscope. For this purpose, the hacker could keep the amplitude of the HF signal HF applied to the data carrier 4 so small that the supply voltage UV would fluctuate about the interruption voltage value UU and would thus be interrupted each time after only one or a few clock cycles CLK.

However, this kind of analysis by a hacker is advantageously precluded by the provision of the continuation voltage value UF as well as by the definition of the reliability time interval TZ. The provision of the continuation voltage value UF precludes a simple fluctuation of the supply voltage UV about the interruption voltage value UU in order to achieve a very slow processing of the communication data KD by the calculating stage 11. As a result of the reset after expiry of the reliability time interval TZ the hacker cannot determine said potentials in the data carrier 4 because the processing is already reset before expiry of the time required for the analysis, when the reliability time interval TZ is exceeded. Thus, the reset means 8 in accordance with the invention have the advantage that a data carrier 4 is obtained which is very well protected against access by a hacker.

At an instant t6 the supply voltage UV exceeds continuation voltage value UF after resetting of the processing performed by the processing means 10, upon which the clock signal CLK is again supplied to the calculating stage 11. The calculating stage 11 subsequently starts the execution of the processing program beginning with the execution of the boot routine.

At an instant t7 the supply voltage UV again decreases below the interruption voltage value UU, upon which the processing is interrupted at the instant t7. At an instant t8 the supply voltage UV also decreases below reset voltage value UR, upon which reset information RI, for resetting the processing preformed by the processing means 10, is applied to the calculating stage 11.

This has the advantage that in the case of a substantial drop in the voltage value of the supply voltage UV below the reset voltage value UR the processing is reset completely and a reliable processing of communication data KD is assured.

It is to be noted that in a data carrier in accordance with the invention the processing performed by the processing means may also be interrupted only partially. Thus, for example processing operations (for example loading operations) with a high power consumption could be interrupted for the time being or could be postponed to an instant at which an adequate voltage value of the supply voltage is assured. Likewise, when the supply voltage decreases below the interruption voltage value the processing by the processing means could be interrupted completely and the processing by the receiving means (for example demodulation) could also be interrupted but could also be continued.

What is claimed is:

1. A data carrier (4) for the contactless communication of communication information (KD) with a transmitting/receiving station (1), having receiving means (7) for receiving an HF signal (HF) containing the communication information (KD) from the transmitting/receiving station (1), and having processing means (10) for processing the received communication information (KD), and having supply voltage generating means (13) for rectifying the received HF signal (HF) and for energizing the processing means (10) with a supply voltage (UV), and having reset means (14) for resetting, when the supply voltage (UV) decreases below a reset voltage value (UR), the processing performed by the processing means (10), characterized in that the reset means (14) interrupts the processing of the communication information (KD) by the processing means (10) at least partially when the supply voltage (UV) decreases below an interruption voltage value (UU), the interruption voltage value (UU) being greater than the reset voltage value (UR).

2. A data carrier (4) as claimed in claim 1, characterized in that, when the supply voltage (UV) decreases below a continuation voltage value (UF) after the processing of the communication information (KD) has been interrupted at least partially, the reset means (14) stops the interruption of the processing of the communication information (KD) by the processing means (10), the continuation voltage value (UF) being greater than the interruption voltage value (UU).

3. A data carrier (4) as claimed in claim 1, characterized in that, when the processing of the communication information has been interrupted at least partially, the reset means (14) determines an interruption time interval (TU) and, when the interruption time interval (TU) thus determined exceeds a reliability time interval (TZ), the reset means (14) resets the processing performed by the processing means (10).

4. A data carrier (4) as claimed in claim 1, characterized in that the data carrier (4) takes the form of an integrated circuit.

* * * * *